(12) United States Patent
Hung

(10) Patent No.: US 7,094,499 B1
(45) Date of Patent: Aug. 22, 2006

(54) CARBON MATERIALS METAL/METAL OXIDE NANOPARTICLE COMPOSITE AND BATTERY ANODE COMPOSED OF THE SAME

(75) Inventor: Ching-Cheh Hung, Westlake, OH (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 395 days.

(21) Appl. No.: 10/457,433

(22) Filed: Jun. 10, 2003

(51) Int. Cl.
*H01M 4/58* (2006.01)
*H01B 1/04* (2006.01)

(52) U.S. Cl. .................. 429/231.8; 252/182.1; 252/503

(58) Field of Classification Search ............ 429/231.4, 429/231.8, 231.95, 232; 252/182.1, 503
See application file for complete search history.

(56) References Cited

U.S. PATENT DOCUMENTS

| | | | |
|---|---|---|---|
| 5,543,378 A | 8/1996 | Wang | 502/174 |
| 5,569,561 A | 10/1996 | Exnar et al. | 429/335 |
| 5,795,679 A | 8/1998 | Kawakami et al. | 429/218.1 |
| 5,965,297 A | 10/1999 | Fanteux et al. | 429/231.8 |
| 6,007,945 A | 12/1999 | Jacobs et al. | 429/218.1 |
| 6,103,393 A | 8/2000 | Kodas et al. | 428/570 |
| 6,130,007 A | 10/2000 | Bi et al. | 429/231.2 |
| 6,143,448 A | 11/2000 | Fauteux et al. | 429/231.8 |
| 6,183,912 B1 | 2/2001 | Nazri | 429/231.8 |
| 6,232,264 B1 | 5/2001 | Lukehart et al. | 502/339 |
| 6,248,477 B1 | 6/2001 | Howard, Jr. et al. | 429/224 |
| 6,255,017 B1 | 7/2001 | Turner | 429/218.1 |
| 6,268,085 B1 | 7/2001 | Manthiram et al. | 429/214 |
| 6,316,143 B1 | 11/2001 | Foster et al. | 429/218.1 |
| 6,391,494 B1 | 5/2002 | Reitz et al. | 429/219 |
| 6,495,291 B1* | 12/2002 | Kohno et al. | 429/231.8 |
| 6,761,744 B1* | 7/2004 | Tsukamoto et al. | 429/231.95 X |
| 6,797,428 B1* | 9/2004 | Skotheim et al. | 429/231.95 X |

OTHER PUBLICATIONS

Ching-Cheh Hung, "Ferric Chloride-Graphite Intercalation Compounds Prepared from Graphite Fluoride." Carbon, vol. 33, No. 3, pp. 315-322, 1995, month unknown.

Ching-Cheh Hung, "Carbon Materials Embedded with Metal Nanparticles as Anode in Lithium-Ion Batteries," Carbon Conference 2001, Lexington, KY, Jul. 14-19, 2001.

* cited by examiner

*Primary Examiner*—Stephen J. Kalafut
(74) *Attorney, Agent, or Firm*—Kevin Turner; Arlene P. Neal; Kent N. Stone

(57) ABSTRACT

A method of forming a composite material for use as an anode for a lithium-ion battery is disclosed. The steps include selecting a carbon material as a constituent part of the composite, chemically treating the selected carbon material to receive nanoparticles, incorporating nanoparticles into the chemically treated carbon material and removing surface nanoparticles from an outside surface of the carbon material with incorporated nanoparticles. A material making up the nanoparticles alloys with lithium.

12 Claims, 4 Drawing Sheets

CARBON MATERIALS METAL/METAL OXIDE NANOPARTICLE COMPOSITE AND BATTERY ANODE COMPOSED OF THE SAME

ORIGIN OF THE INVENTION

The invention described herein was made by an employee of the United States Government and may be manufactured and used by or for the Government for Government purposes without payment of any royalties thereon or therefore.

BACKGROUND OF THE INVENTION

1. Field of the Invention

The present invention relates to composite materials, used in lithium-ion batteries as anodes. In particular, the present invention is directed to composites formed with carbon materials and metal and/or metal oxide nanoparticles and anodes formed from the composites that carry high current density, has high cycle life, high reversible capacity and low irreversible capacities.

2. Description of Related Art

Lithium-ion batteries have many uses including computers, portable phones and electric cars. Today's lithium-ion batteries use carbon as an anode to store and release lithium. The carbon anodes typically have long cycle life due to the presence of a protective surface-electrolyte interface layer (SEI), which is resulted from the reactions between lithium and the electrolytes during the $1^{st}$ several cycles of charge-discharge. The lithium in this reaction is obtained from reduction of some of the lithium ions originally intended for charge transfer purpose. As SEI formed, the lithium ions become part of the inert SEI layer and become irreversible, i.e, they can no longer be the active element for charge transfer. Therefore, it is desirable to use a minimum amount of lithium for the formation of an effective SEI layer.

The effectiveness of the SEI to protect the anode material depends on a number of factors. One of the important factors is the type of carbon surface. It is desirable to have a certain type of carbon surface that could use minimum amount of lithium to form SEI that is most effective in protecting the anode material.

If the bulk of the carbon material is graphite, then the reversible capacity of such anode has a theoretical of 372 mAh/g. This is based on the results of research of intercalation, which indicated that the lithium intercalated carbon has a maximum atomic ratio of lithium to carbon: 1/6.

In order to have a light battery that can be used for a long time before recharge is needed, it is desirable to increase the capacity of carbon materials to store lithium. Recent investigations indicated that some types of non-graphitized carbon anodes (such as carbon nanotube) have lithium storage capacity higher than 372 mAh/g. This may be caused by some additional types of mechanisms other than commonly known mechanism of intercalation. In most cases, these types of carbon anodes have high irreversible capacity and/or low cycle life, and are still being studied.

Another type of material that can possibly be used as an anode in lithium-ion batteries is elemental metal that alloy with lithium. Some metal oxides have also been proposed for such application. These anodes may have reversible capacity higher than the 372 mAh/g value for graphite stated above, but, again, they generally had short cycle lives. It is believed that the volume changes during lithium insertion-release and the resulting internal stress or disintegration are the reasons for their short cycle lives and low capacities. To counter such mechanical degradation, small active particles supported with less active or non-active matices have been proposed. Examples of these metal elements are Si, Sn and SnO2.

In order to have a battery for high power density applications such as electric cars, it is desirable to have an anode that can carry high current (i.e., that can quickly store and release lithium). Previous report on the current density-performance relation are few, but it is believed that current density can be higher if the resistance for the lithium ions to travel for storage/release can be reduced.

Prior art electrodes have been disclosed, but many of those disclosures have deficiencies in some ways. For example, in U.S. Pat. No. 6,007,945, by Nazri, a composite is formed by heating a mixture of carbon with metal halide in the presence of "sp elements." However, this composite has the possibility of producing metal chloride intercalated carbon as unwanted side-products.

In U.S. Pat. No. 6,143,448, by Fauteux et al., a composite is formed by mixing carbon with a metal salt in water, followed by evaporation, heating and further treatment. The process produces a composite with high surface area which is not always preferred.

In U.S. Pat. No. 6,103,393, by Kodas et al., provides carbon-metal particles by mixing the reactant, making the mixture into an aerosol, and then heating. Every particle contains a carbon phase and a metal phase, where the carbon phase is substantially unchanged in form. In many cases, the multiphase composite does not have the desired properties.

In U.S. Pat. No. 6,007,945, by Jacobs et al., a material is formed of a solid solution of titanium oxide and tine oxide to be used as anode in a lithium-ion battery. However, the nanoparticles of the anode material reacts with the electrolyte during the charge-discharge cycles, leading to reduced long-term utility.

Even taking these examples into account, the prior art has not demonstrated a composite material that has all of the properties desired for use in an anode for lithium-ion batteries. Thus, there is a need for a new anode for lithium-ion batteries that can carry high current density, has high cycle life, high reversible capacity, and low irreversible capacities. There is also a need for a method of producing such a composite that allows for such composites to be readily produced.

SUMMARY OF THE INVENTION

The present invention is directed to a new anode for lithium-ion batteries that can carry high current density, has high cycle life, high reversible capacity, and low irreversible capacities. Additionally, the invention is directed to composites used for these improved anodes and methods used to form those composites.

According to one aspect of this invention, a method of forming a composite material for use as an anode for a lithium-ion battery is disclosed. The steps include selecting a carbon material as a constituent part of the composite, chemically treating the selected carbon material to receive nanoparticles, incorporating nanoparticles into the chemically treated carbon material and removing surface nanoparticles from an outside surface of the carbon material with incorporated nanoparticles. The present invention is also directed to a material making up the nanoparticles alloys with lithium.

Additionally, the method can further include a step of pre-heating the selected carbon material in an inert environment. Additionally, the selected carbon material may have graphene layers that are perpendicular to surfaces of the selected carbon material, and therefore can quickly store and release large amounts of lithium. Additionally, the selected carbon material may be graphitized carbon fibers, graphitic flakes and graphitic fluoride fibers. The removal of surface nanoparticles may occur through evaporating surface nanoparticles under high temperatures or treating the outside surface with an HCl solution. Also, the material making up the nanoparticles may, in some embodiments, be palladium or at least one of tin and tin oxide.

According to another embodiment, an anode for a lithium-ion battery, formed from a composite material is disclosed. The anode is made up of a carbon material having incorporated nanoparticles, wherein an outside surface of the carbon material with incorporated nanoparticles is largely free of surface nanoparticles.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

Figure 1:
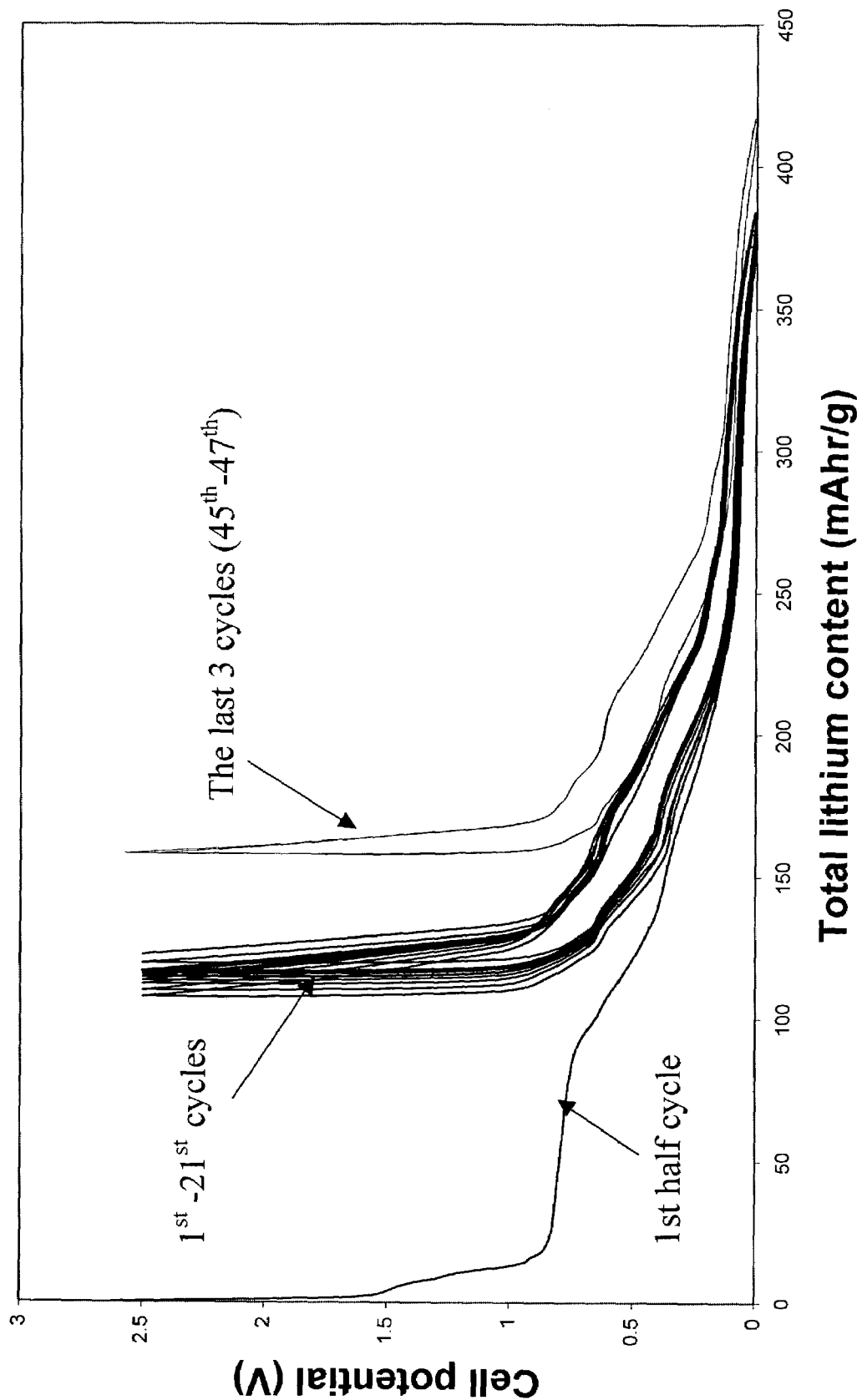
FIG. 1 provides a graph illustrating the cell potential as a function of total lithium content over many cycles.

The present invention is directed to carbon-nanoparticle composite is used as the anode in lithium-ion battery. The composite is made of carbon material embedded with metals and/or metal oxides in the form of nanoparticles. The preferred carbon materials are such that they can quickly store/release a large amount of lithium, their graphene layers were perpendicular to the surfaces, and the majority of the atoms on the surface were the carbon atoms at the edge of the basal plane. The nanoparticles of metal and/or oxide are made of single element (and/or oxide) or an alloy of several elements (and/or oxide). It shall be a material that alloys with lithium. Compare to the state-of-the-art anodes, the new anode can carry high current density, has high cycle life, high reversible capacity, and low irreversible capacities.

The present invention describes, according to one embodiment, a method to fabricate a high-performance anode for lithium-ion battery, and the product fabricated by this process. The general method to make this carbon-nanoparticle product is described in the following 4 steps:

(1) Select a carbon material (precursor) to which the nanoparticles are to be embedded. The carbon precursors are preferred to be a good material for electrochemically store/release lithium. The structure of the carbon is such that its resistance for lithium/lithium ion to travel/intercalate is minimum. The preferred structure is that the graphene layers were perpendicular to the carbon surfaces, and the majority of the atoms on the carbon surface were the carbon atoms at the edge of the basal plane. It is believed that carbon with these types of surface and structure carry high current density, because they have least resistance for lithium ions to travel into/out of its structure in a short time. The nanoparticles are the type of metals, oxides, and/or their alloy, and need to be able to form an alloy with lithium so that it can serve the purpose of storing/release more lithium for lithium-ion battery application.

(2) Chemically treat the carbon materials to add nanoparticles into the carbon. Methods are described in the attached documents. In addition to carbon, metal and/or metal oxides nanoparticles also provide lithium storage capacity, while SEI on the carbon surface protects both lithium and the metal particles in the carbon interior. Also, the nanoparticles may provide additional channels for lithium and/or lithium ion to transport in carbon, and therefore increase the anode's ability to carry high current. Furthermore, the effects of the nanoparticles volume changes during the lithium alloy formation may be minimized. This is because the volume change of the nanoparticles may not cause much internal stress due to the small size of the particles, and the voids in the carbon interior may accommodate such volume changes. After treatment, the ability of the carbon to store/release lithium may remain or even increase, the structure of the carbon may become less ordered, but the majority of the atoms on the carbon surface remain to be the carbon atoms at the edge of the basal plane.

(3) Remove the nanoparticles on the surface in order to form an SEI layer that is thin and effective for protecting carbon from solvent attack, and therefore results in anodes with long cycle life and low irreversible capacity. This can be done by either high temperature evaporation or wet chemistry such as exposure to HCl solution at room temperature.

(4) Use this product as the anode material to make lithium-ion batteries.

A carbon-nanoparticle composite for anode lithium-ion battery application, where the nanoparticles are embedded in carbon, and are the type of metals, oxides, or their alloy such that they can form an alloy with lithium. This results in a product with high reversible capacity and low resistance of lithium/lithium-ion transport at the interior of the composite. In addition, the composite contains one or more of the following features: Both the carbon and the nanoparticles are the active elements of the anode of the lithium-ion battery, resulting in high reversible capacity. The majority of the atoms on the carbon surface were carbon atoms at the edge of the basal plane, resulting in low resistance of lithium ion transport across the anode-electrolyte interface, and therefore high current density of the battery. The surface contains little nanoparticle materials, resulting in thin and effective SEI and therefore low irreversible capacity and long cycle life.

Basic methods to make the above are described above. Additional features that may be used in the above-described methods include one or more of the following: Carbon precursor selection is such that it can be intercalated with lithium electrochemically, the graphene layers were perpendicular to the carbon surfaces, and the majority of the atoms on the carbon surface were carbon atoms at the edges of the basal plane. The composites may be formed with Pd, PdO, Sn or SnO as nanoparticles materials, and pitch-based carbon fiber as carbon precursor. Additionally, methods may include optional post-treatment of the carbon-nanoparticles being heat treated at a temperature of 1000° C. or higher in inert environment, or room temperature chemical treatment by HCl.

FIG. 1 shows the total lithium content (in mAhr/g) during two different time periods in the carbon-tin composite described in Example 5: The fist 21 cycles (#1 to 21) and the last 3 cycles (#45–47). Before cycling, the composite contained 80 wt % of carbon and 20 wt. % of tin. The total lithium content includes the irreversible lithium content and the reversibly stored lithium. This figure shows that, during the initial period of the cycling, the carbon-tin composite reacted to some lithium irreversibly, producing a protecting SEI layer on the surface. After such period, the irreversible reaction stopped, and, as shown in the plots for the last 3 cycles, the lithium that is inserted into carbon can be completely released. This means the cycle life of the material can be very long.

Figure 2:
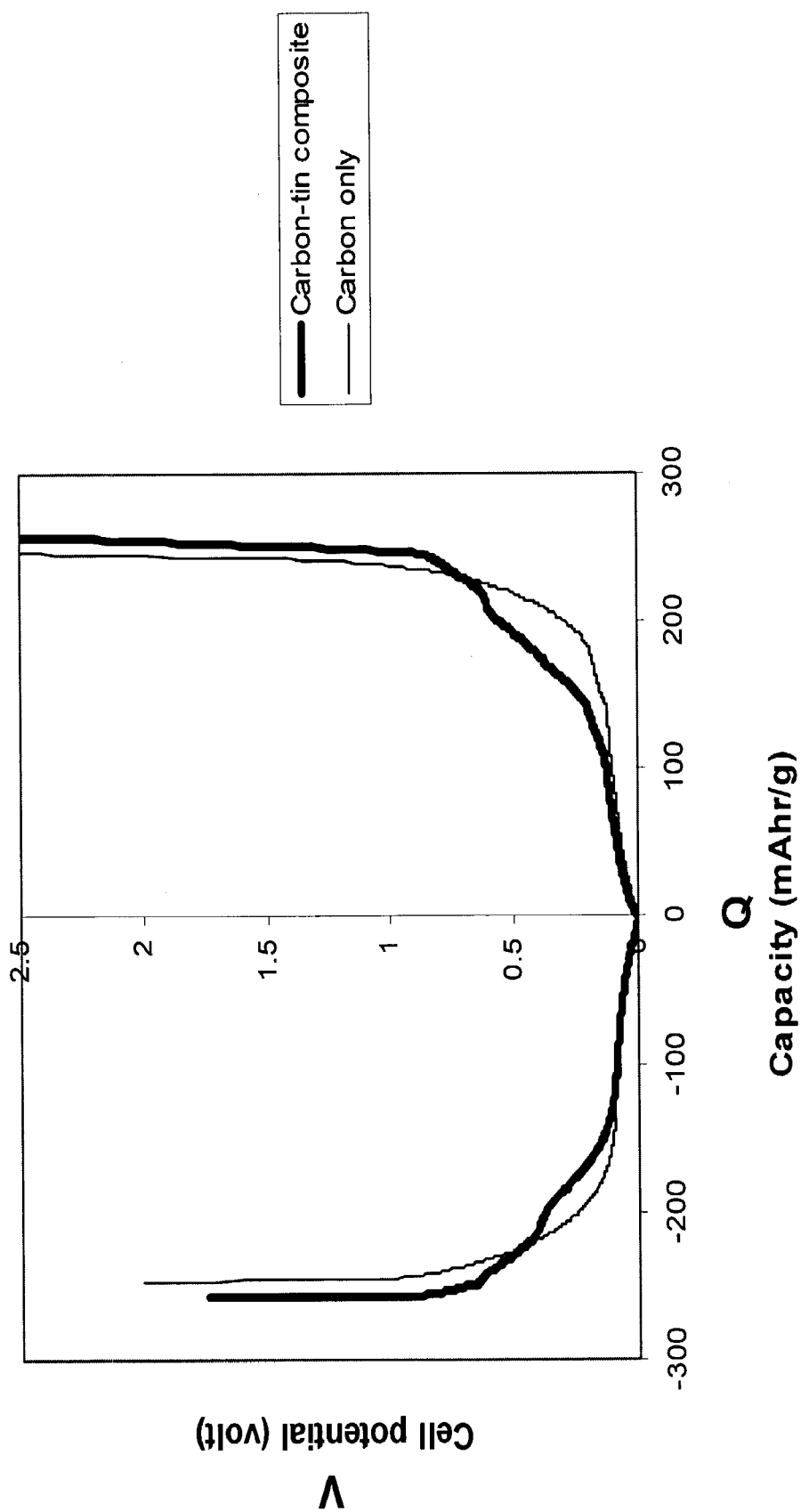
FIG. 2 illustrates a relationship between cell potential and capacity in both carbon-tin composite and carbon only material.

FIG. 2 illustrates two capacity-cell potential plots from the charge-discharge cycles for two cells: a carbon-tin composite/Li cell and a carbon/Li cell. Carbon materials of comparable properties were used in these two cells. The carbon-tin composite/Li cell was described as Example 5, discussed below (80 wt % of carbon and 20 wt. % tin). The data represented here are those taken after the solid-electrolyte interface (SEI) were completely formed, and the irreversible lithium content had approached its final, maximum value. This figure shows that adding tin nanoparticles into carbon increase the reversible capacity of the carbon.

Figure 3:
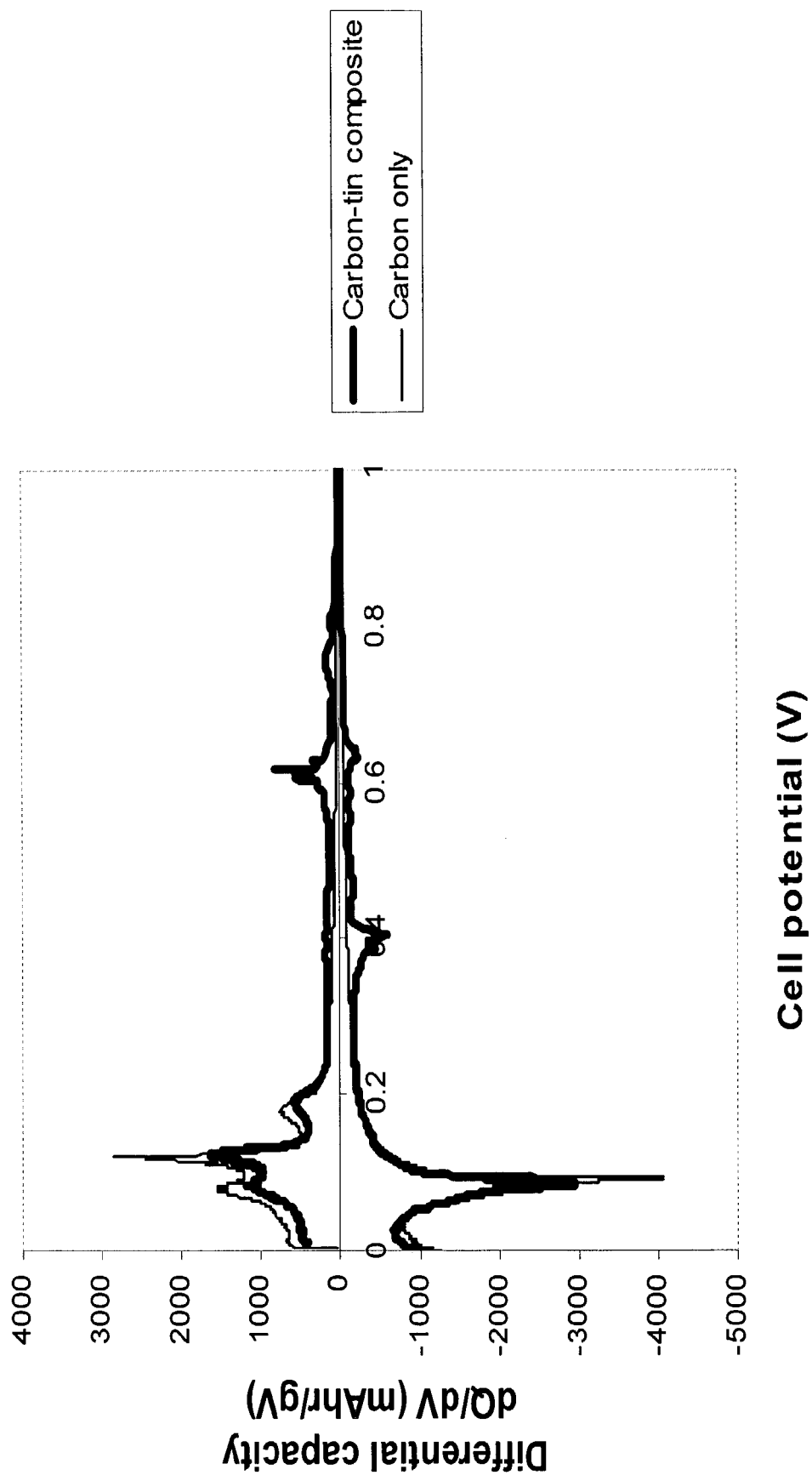
FIG. 3 illustrates a relationship between cell potential and differential capacity in both carbon-tin composite and carbon only material.

FIG. 3 illustrates results obtained from the same data as presented in FIG. 2, except the differential capacity was used to plot against the cell potential. This figure shows that both carbon and tin were active materials. Tin store lithium at two regions centered at 0.40 and 0.64V and release lithium at two regions centered at 0.62 and 0.76V. Carbon store lithium at a region centered at 91 mV and release lithium at three regions centered at 79, 120, and 179 mV.

Figure 4:
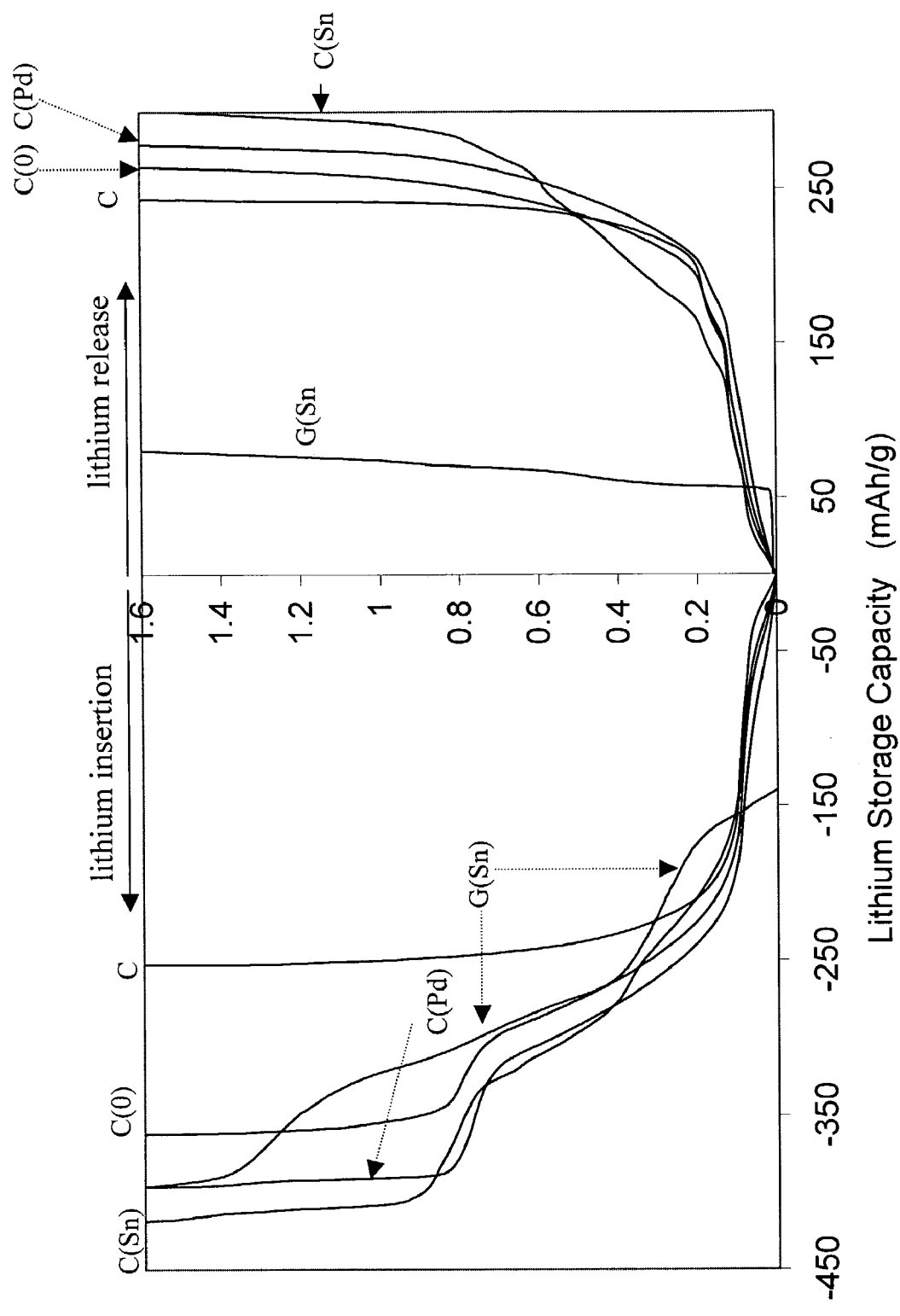
FIG. 4 illustrates a relationship between lithium storage capacity and the voltage between working and reference electrodes during the first cycle of lithium insertion/release for materials discussed in the presented examples.

FIG. 4 provides $1^{st}$ cycle capacity-cell potential plots from some of the Examples described below. The $1^{st}$ cycle data is important because the $1^{st}$ cycle lithium insertion reveal the process of SEI formation, and the $1^{st}$ cycle lithium release give an approximate value of reversible capacity. In this figure, C(Pd) is the material described in Example 3, C(Sn), G(Sn), and C are described in Examples 4, 6, and 1, respectively. C(O) was made from C. It does not contain nanoparticles, but has comparable properties as the carbon in C(Sn) and C(Pd). It is not described in the examples, but was reported previously.

The examples described below are illustrative of the many different embodiments of the present invention.

EXAMPLE 1

Example 1 utilizes pitch based graphitized carbon fibers. The commercially available carbon fiber has an orderly structure, where graphene layers were perpendicular to the surfaces, and the majority of the atoms on the fiber surface where carbon atoms at the edge of the basal plane. Its diameter was about 10 μm. It x-ray diffraction (002) peak was at 3.37 Å. It was preheated in 1000° C. nitrogen and then electrochemically tested in a half cell C/0.5M LiI-50/50 (vol %) EC and DMC/Li for its ability to store and release lithium. The anode sample was tied to the equipment using nickel string. No binder was used. The irreversible capacity was found to be as low as 10 mAh/g. After the $2^{nd}$ cycle of lithium insertion/release, the reversible capacity fluctuate in a small range of 240±2 mA in the next 10 cycles, as long as the current density was kept below 40 mA/g.

After formation of the SEI layer reached completion (i.e., after cycles of lithium insertion and release at a current density of 10 mA/g), the sample was tested at high current density. The lithium insertion rate was as high as 200 mA/g. At this rate of insertion, carbon quickly stores 190 mAh/g of lithium. Also, the lithium release rate was as high as 2000 mA/g. At this rate of release, fully intercalated carbon quickly removes 230 mAh/g of lithium.

EXAMPLE 2

Example 2 utilizes natural graphite flake. The commercially available graphite flake had an orderly structure, where the graphene layers were parallel to the surfaces, and only a small amount of carbon atoms on the surface were at edges of the basal plane. Its particle size was 50±30 μm. Its x-ray diffraction (002) peak was at 3.35 Å. It was preheated in 1000° C. nitrogen and then electrochemically tested in a half cell C/0.5M LiI-50/50 (vol %) EC and DMC/Li for its ability to store and release lithium. PVDF was used as the binder. Copper foil was used as the substrate. The reversible capacity was found to be 310, 290, 260 and 250 mAh/g, respectively for the $1^{st}$ 4 cycles of lithium insertion and release, where the current density was in the 10–15 mA/hr range. These results are different from those described in Example 1 in that this sample has higher irreversible capacity (see FIG. 4) and shorter cycle life. Such difference indicates that, for a lithium-ion battery application, carbon having the structure and surface described in this example is not good as that described in Example 1, probably because it has longer and narrower path for intercalation, and because it forms thicker and less effective SEI layers.

EXAMPLE 3

Example 3 utilizes carbon containing palladium nanoparticles. A graphite fluoride fiber sample $CF_{0.6}$ was used to make this product. The $CF_{0.6}$ fiber sample was made from the graphitized sample described in Example 1. The $CF_{0.6}$ fibers were placed in a test tube with $PdCl_2$ and $CuCl_2$ under a nitrogen environment. Excess amount of chlorides were used such that the $CF_{0.6}$:$PdCl_2$:$CuCl_2$: mass ratio was 2:4:1. The mixture was heated at 310° C. for 60 hours and then 370° C. for 10 hours. The product was stored in ambient air for some time, and then post-heated at 1000° C. in nitrogen, resulting in Pd nanoparticles in carbon.

This product is electrochemically tested in a half cell similar to those described in the above examples. Results of this test were compared to a similar test, which was conducted on a pure carbon sample whose properties was similar to the carbon part of this carbon-nanoparticle composite. Results of the first cycle lithium insertion/release are described in FIG. 4. It was found that the two samples had similar irreversible capacity and cycle life, but the carbon-palladium nanoparticle composite has a higher reversible capacity. The test data indicated that the higher reversible capacity was resulted from more lithium storage when voltage was in the range of 0 to 70 mV vs Li. It was probably caused by the formation of $Li_xPd$, where x ranges from 0.5 to 5.

EXAMPLE 4

Example 4 utilizes carbon containing tin and tin oxide nanoparticles. A graphite fluoride fiber sample $CF_{0.65}$ was used to make this product. The $CF_{0.65}$ fiber sample was made from carbon fibers described in Example 1. The $CF_{0.65}$ fibers were placed in a test tube with $SnCl_2$ under nitrogen environment. Excess amount of $SnCl_2$ was used such that the $CF_{0.65}$:$SnCl_2$ mass ratio was 1:3.5. The mixture was heated at 370° C. overnight (about 10 hours). The product was rinsed with distilled water 3 times, 20 seconds each. It was then stored in ambient air for some time, then post-heated at 1100° C., resulting in Sn (30% by weight) nanoparticles in carbon (70% by weight). A sample of this product was electrochemically tested in a half cell similar to the one described in the above examples.

As a current density of 10 mA/g, the irreversible capacity was found to be about 120 mAh/g. After the $2^{nd}$ cycle of lithium insertion/release, the reversible capacity decreased slowly from 310 to 300 mAh/g during the $1^{st}$ 7 cycles. Furthermore, the insertion capacities were consistently 5–6 mAh/g higher than the release capacities in every one of the 7 cycles. This is an indication of solvent attack due to the incomplete protection of the SEI layer. The 1$^{st}$ cycle lithium insertion/release is also illustrated in FIG. 4.

EXAMPLE 5

Example 5 utilizes carbon containing large quantities of Sn/SnO nanoparticles at the interior, but few on the surface. A sample of the product described in the Example 4 was rinsed in 37% HCl for 20 seconds before it was similarly tested electrochemically. The purpose of this HCl treatment is to remove the nanoparticles from the carbon surface. After such treatment, the sample was approximately 80% carbon and 20% others by weight.

At a current density of 10 mA/g, the irreversible capacity was found to be about 120 mAh/g. After the 2$^{nd}$ cycle of lithium insertion/release, the reversible capacity stabilized and fluctuated in 265–270 mAh/g range for the next 8 cycles. Furthermore, the insertion capacities were found to be about the same as the release capacities in every cycle after the 5$^{th}$ lithium insertion/release. This is an indication that the solvent attack did not exist because after 5 cycles the SEI layer was well formed and provided a good protection of the anode.

A comparison between the data in the Examples 4 and 5 indicated that removing the nanoparticles from the carbon surface resulted in an anode having an effective SEI layer, and therefore a long cycle life in lithium-ion batteries. It is also indicated that the reversible capacity decreased as some tin/tin oxide nanoparticles were removed due to HCl rinsing.

The role of such nanoparticles is thus clearly demonstrated. For the purpose of high capacity, long cycle life anode in lithium-ion batteries, it is desirable to use carbon materials containing large quantities of such nanoparticles at the interior, but few on the surface.

EXAMPLE 6

Example 6 utilizes natural graphite containing tin-tin oxide nanoparticles. Example 4 was repeated, except the carbon precursor was not pitch based carbon fibers described in Example 1, but a natural graphite described in Example 2. The resulting data were very different from those described in Example 4. Its first cycle lithium insertion/release is also illustrated in FIG. 4. During the voltage of lithium intercalation/release (i.e., 0<$V_{wr}$<0.3V), not much lithium could be inserted into/released from the anode. In fact, the mechanism of lithium insertion bypassed intercalation. It changed quickly from SEI formation and absorption ($V_{wr}$>0.3 volt) to lithium plating (0≈$V_{wr}$). In this example, some lithium plating was allowed to take place. Excluding the capacities of lithium plating, the 1$^{st}$ cycle has 260 mAh/g lithium insertion and 30 mAh/g of lithium release. During the 2$^{nd}$ cycle, it had 10 mAh/g of lithium insertion, and near zero of lithium release.

This can be compared to Example 4, where it is clear that the use of nanoparticles enhances the performance of some, but not all, carbon as anodes for lithium-ion applications. If the carbon is such that the majority of the atoms on the surface were the carbon atoms at the edge of the basal plane, then the intercalation will encounter low resistance. If the carbon is such that the graphene layers were parallel to the surfaces, and/or only a small amount of carbon atoms on the surface were at the edges of the basal plane, then the intercalation process is difficult.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method of forming a composite material for use as an anode for a lithium-ion battery, the method comprising the steps of:
   selecting a carbon material as a constituent part of the composite;
   chemically treating the selected carbon material to receive nanoparticles;
   incorporating nanoparticles into the chemically treated carbon material; and
   removing surface nanoparticles from an outside surface of the carbon material with incorporated nanoparticles;
   wherein a material making up the nanoparticles alloys with lithium.

2. The method as recited in claim 1, further comprising a step of pre-heating the selected carbon material in an inert environment.

3. The method as recited in claim 1, wherein the selected carbon material can quickly store and release lithium.

4. The method as recited in claim 1, wherein the selected carbon material has graphene layers that are perpendicular to surfaces of the selected carbon material.

5. The method as recited in claim 1, wherein the selected carbon material comprises graphitized carbon fibers.

6. The method as recited in claim 1, wherein the selected carbon material comprises graphitic flakes.

7. The method as recited in claim 1, wherein the selected carbon material comprises graphitic fluoride fibers.

8. The method as recited in claim 1, wherein the step of removing surface nanoparticles comprises evaporating the surface nanoparticles.

9. The method as recited in claim 1, wherein the step of removing surface nanoparticles comprises treating the outside surface with an HCl solution.

10. The method as recited in claim 1, wherein the material making up the nanoparticles comprises palladium.

11. The method as recited in claim 1, wherein the material making up the nanoparticles comprises at least one of tin and tin oxide.

12. An anode for a lithium-ion battery, the anode comprising:
   a carbon material having incorporated nanoparticles, with the nanoparticles comprising a material that alloys with lithium;
   wherein an outside surface of the anode does not have surface nanoparticles and the carbon material comprises at least one of graphitized carbon fibers, graphitic flakes graphitic fluoride fibers.

* * * * *